(12) United States Patent
Chauvier et al.

(45) Date of Patent: Nov. 10, 2015
(10) Patent No.: US 9,183,671 B2

(54) METHOD FOR ACCELERATING MONTE CARLO RENDERS

(71) Applicant: E-ON SOFTWARE, Paris (FR)

(72) Inventors: Julien Chauvier, Paris (FR); Mauricio Delbracio, Paris (FR); Nicholas Phelps, Paris (FR)

(73) Assignee: E-ON SOFTWARE, Paris (FR)

( * ) Notice: Subject to any disclaimer, the term of this patent is extended or adjusted under 35 U.S.C. 154(b) by 379 days.

(21) Appl. No.: 13/668,807

(22) Filed: Nov. 5, 2012

(65) Prior Publication Data

US 2014/0098098 A1    Apr. 10, 2014

(30) Foreign Application Priority Data

Oct. 9, 2012    (FR) ..................... 12 59617

(51) Int. Cl.
*G06T 15/50* (2011.01)
*G06T 15/06* (2011.01)

(52) U.S. Cl.
CPC ................. *G06T 15/50* (2013.01); *G06T 15/06* (2013.01)

(58) Field of Classification Search
None
See application file for complete search history.

(56) References Cited

U.S. PATENT DOCUMENTS

| | | | |
|---|---|---|---|
| 7,751,620 B1 * | 7/2010 | Cosoi | 382/168 |
| 2003/0020743 A1 * | 1/2003 | Barbieri | 345/719 |
| 2012/0070041 A1 * | 3/2012 | Wang | 382/118 |
| 2012/0308126 A1 * | 12/2012 | Hwang et al. | 382/165 |
| 2014/0029849 A1 * | 1/2014 | Sen et al. | 382/167 |

OTHER PUBLICATIONS

Jie Guo et al: "Point-wise Adaptive Filtering for Fast Monte Carlo Noise Reduction", Pacific Conference on Computer Graphics and Applications—Short Papers, Sep. 12, 2012, XP055076190.
Buades A et al: "A review of image denoising algorithms, with a new one", Multiscale Modeling & Simulation, Society for Industrial and Applied Mathematics, US, vol. 4, No. 2, Jul. 18, 2005, pp. 490-530, XP002496485.
Mauricio Delbracio Bentancor: "Two Problems of Digital Image Formation: Recovering the Camera Point Spread Function and Boosting Stochastic Renderers by Auto-similarity Filtering", Mar. 2013, XP055076242.
Pradeep Sen et al: "On filtering the noise from the random parameters in Monte Carlo rendering", ACM Transactions on Graphics, vol. 31, No. 3, May 2012, pp. 1-15, XP055076243.
French Search Report for French Application No. 1259617, dated Aug. 23, 2013 with Written Opinion.
Kajiya, James T.: "The Rendering Equation", SIGGRAPH Comput. Graph., vol. 20, No. 4, pp. 143-150, Aug. 1986.

* cited by examiner

*Primary Examiner* — Stephen R Koziol
*Assistant Examiner* — Khoa Vu
(74) *Attorney, Agent, or Firm* — Sughrue Mion, PLLC

(57) ABSTRACT

An image rendering method comprising the steps of:
(a) performing a noisy estimation of a given view of a given scene of said image using a Monte-Carlo stochastic renderer, wherein general information of each ray sample, such as color and position in the image plane, is stored,
(b) calculating a similarity measure between two sets of samples cast from two pixels of said scene and their neighbors, and
(c) generating an output image wherein each pixel color is a weighted combination of the pixel colors generated from (a) with weights based on the similarity measure of (b) between the respective set of samples cast from the pixels and their neighbors.

14 Claims, 2 Drawing Sheets

METHOD FOR ACCELERATING MONTE CARLO RENDERS

FIELD OF THE INVENTION

The present invention is related to a method for accelerating Monte Carlo renders.

BACKGROUND OF THE INVENTION

Producing high quality realistic images in reasonable time remains a computer graphics challenge. The goal of a global illumination render is to create a physical image of the steady-state light distribution from a given point of view of a given scene. The rendering equation is usually solved by Monte Carlo numerical integration techniques, as described in the article "The rendering equation" by James T. Kajiya, SIGGRAPH Comput. Graph., 20:143-150, August 1986. In a Monte Carlo renderer, image pixels are computer-generated by averaging the contribution of stochastic rays (random walks, Monte Carlo samples) cast from the camera through the scene.

The principal problem of Monte Carlo rendering is that the variance of the light estimator decreases linearly with the number of stochastic samples. Thus the root mean squared error to an ideal image decreases as the square root of the number of samples. Several hours or even days may be necessary to produce noiseless realistic images. This involves high costs.

SUMMARY OF THE INVENTION

One object of the present invention is to provide a method for accelerating Monte Carlo renders which does not comprise the above-described drawbacks.

Another object of the present invention is to provide such a method which is less expensive to implement.

The present invention thus provides an image rendering method comprising the steps of:

(a) performing a noisy estimation of a given view of a given scene of said image using a Monte-Carlo stochastic renderer, wherein general information of each ray sample, such as color and position in the image plane, is stored, (b) calculating a similarity measure between two sets of samples cast from two pixels of said scene and their neighbors, and (c) generating an output image wherein each pixel color is a weighted combination of the pixel colors generated from (a) with weights based on the similarity measure of (b) between the respective set of samples cast from the pixels and their neighbors.

Advantageously, a color histogram is associated with each pixel containing the colors of all rays that hit the pixel.

Advantageously, a histogram distance, such as the Kolmogorov-Smirnof distance, permits to evaluate the similarity of different pixels.

Advantageously, a weighted average of the means of the rays in the different similar pixels is used to generate the color in the pixel.

Advantageously, the comparison of two pixels involves their histogram and the histograms of their neighbors so as to reinforce the similarity criterion.

Advantageously, the means, variance and other statistical moments of each ray histogram are used to compare the ray histograms.

Advantageously, the ray color histograms can be compared by comparing their component histograms, which are three one-dimensional histograms.

Advantageously, the ray color histograms are divided into 3D bins and compared directly as three-dimensional histograms.

Advantageously, other ray classification criteria obtained from additional information of the rays, e.g. normal to the surface, object id, object color at the last impact, may be used, the ray histogram may having a higher dimension and the comparison of histograms being made in a higher dimensional space.

Advantageously, the sample data sets $S_x$ and $S_y$, cast from pixels x and y, with respective $h_x^k$ and $h_y^k$ binned histograms with $n_b$ bins, are compared using the Chi-Square distance, namely $$d_{\chi^2}(S_x, S_y) = \sum_{k=1}^{n_b} \frac{\left(\sqrt{\frac{n_y}{n_x}} h_x^k - \sqrt{\frac{n_x}{n_y}} h_y^k\right)^2}{h_x^k + h_y^k}$$

where $n_y = \Sigma h_y^k$ and $n_x = \Sigma h_x^k$ are the total number of samples in each set.

Advantageously, in order to take into account spatial coherence, the previous distance can be extended to patches as follows, $$d_{\chi^2}(P_x, P_y) = \sum_{|z| \leq w} d_{\chi^2}(S_{x+z}, S_{y+z})$$

Advantageously, the weights between pixel x and y are calculated as $w(x; y) = 1$ if $d_{\chi^2}(P_x, P_y) < th$ and $w(x; y) = 0$ otherwise;

where th is a threshold proportional to the number of non-empty bins in the histograms of x and y.

Advantageously, the method comprises generating an output image is wherein each pixel color is a weighted combination of the pixel colors generated from the noisy estimation (a) with weights based on the similarity measure of (b) between the respective set of samples cast from the pixels and its neighbors, wherein the final pixel is calculated as $$\bar{u}(x) = \frac{1}{\sum_y w(x, y)} \sum_y u(y) w(x, y)$$

where the color value u(y) at pixel y is calculated as a weighted average of the rays in the pixel y and its neighbors by using a box, Gaussian, Mitchell or any other classical linear filter, where u denotes the color image and $\bar{u}$ the filtered output color image.

Advantageously, said method can be used iteratively by i) generating a first noisy image ii) identifying those pixels which are more error prone, as for example those with high sample variance iii) obtaining more samples for these pixels and iv) using any of the above methods to increase further the number of rays involved in the estimation of the colors of each pixels.

BRIEF DESCRIPTION OF THE DRAWINGS

The characteristics and advantages of the invention appear more clearly from the following detailed description, given as a non-limiting example, and referring to the accompanying drawings, in which.

DETAILED DESCRIPTION OF THE INVENTION

In the following, the terms "rays" and "Monte Carlo samples" denote a light ray simulated by the Monte Carlo sampler and including at least the following information: its color and the image pixel that it has hit. Other information on the ray, such as the incidence angle, number of bounces, surface geometrical information on the last impact, may also be used.

The invention permits to accelerate the convergence of a Monte Carlo stochastic renderer by:
- performing a first fast sampling, yielding an image where each pixel has been hit by at least two rays;
- grouping the rays into coherent groups; for instance, the rays hitting a given pixel, or a given neighborhood, can make a group;
- comparing different groups to identify similar groups;
- when groups match, using them jointly to generate the final color value at the pixels they are attached to;
- in that way, the generated final image reuses several times the same rays at different pixels. It therefore appears to have been generated by a much larger number of ray samples than those actually used.

In a preferred simple implementation, each group of rays is constituted s of the rays hitting a given pixel. Thus, each group of rays is associated with one pixel. The comparison of groups permits to identify "similar pixels", namely those which have been hit by a similar ray distribution.

Figure 1:
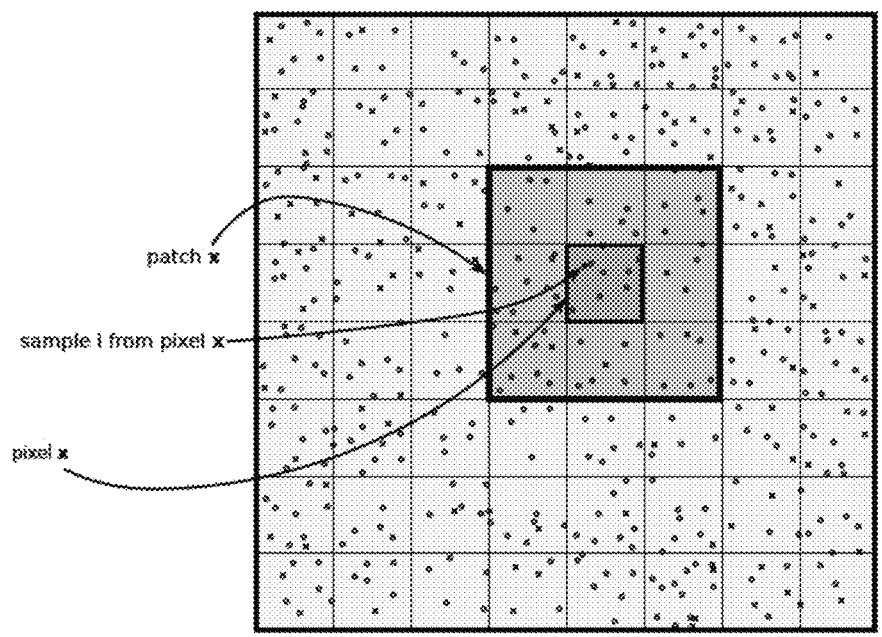
FIG. 1 schematically shows a patch.

More generally, a group of rays, also named "patch", can involve the rays hitting a pixel and its neighbors, as illustrated in FIG. 1. The comparison then compares pixel neighborhoods.

If the order under which rays hit a given pixel is irrelevant, as it can be in Monte Carlo samplers, the comparison of groups of rays can be done using an order invariant similarity measure.

Figure 2:
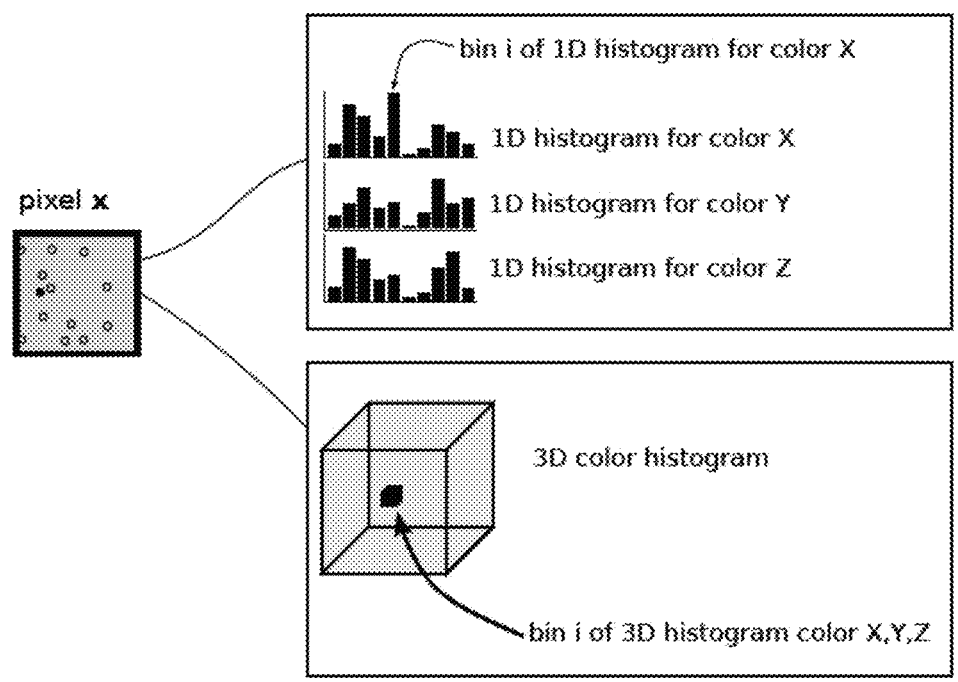
FIG. 2 schematically shows 1D and 3D histograms.

A color histogram can be associated with each pixel containing the is colors of all rays that hit the pixel. Thus, the comparison of two pixels may involve their histogram and the histograms of their neighbors so as to reinforce the similarity criterion. The ray color histograms can be compared by comparing their component histograms, which are three one-dimensional (1 D) histograms. Alternatively, the ray color histograms can be divided into 3D bins and compared directly as three-dimensional histograms. FIG. 2 shows the difference between 1D and 3D histograms.

A histogram distance, such as the Kolmogorov-Smirnof distance, can permit to evaluate the similarity of different pixels.

Figure 3:
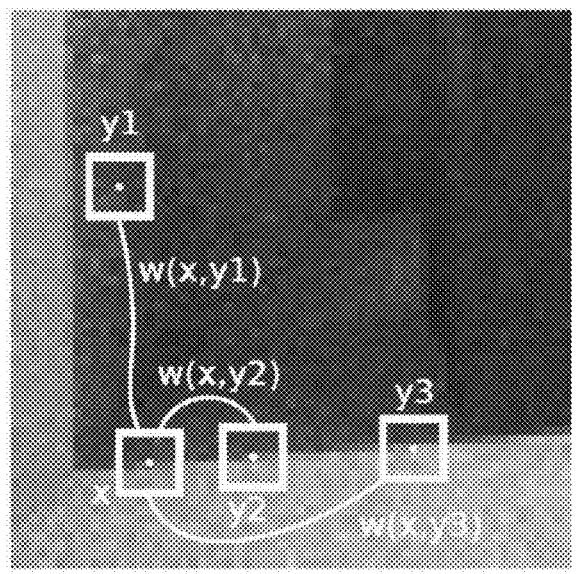
FIG. 3 schematically shows a pixel X to be averaged with other similar neighbor pixels Yi with respective weights w(X, Yi), and FIG. 4 compares the method of the invention with prior art is methods.

A weighted average of the means of the rays in the different similar pixels can be used to generate the color in the pixel, as illustrated in FIG. 3.

The means, variance and other statistical moments of each ray histogram can be used to compare the ray histograms.

Other ray classification criteria obtained from additional information of the rays, e.g. normal to the surface, object id, object color at the last impact, may also be used, the ray histogram may have a higher dimension and the comparison of histograms be made in a higher dimensional space.

In an advantageous embodiment, the sample data sets $S_x$ and $S_y$, cast from pixels x and y, with respective $h_x^k$ and $h_y^k$ binned histograms with $n_b$ bins, are compared using the Chi-Square distance, namely $$d_{\chi^2}(S_x, S_y) = \sum_{k=1}^{n_b} \frac{\left(\sqrt{\frac{n_y}{n_x}} h_x^k - \sqrt{\frac{n_x}{n_y}} h_y^k\right)^2}{h_x^k + h_y^k}$$

where $n_y = \Sigma h_y^k$ and $n_x = \Sigma h_x^k$ are the total number of samples in each set.

In order to take into account spatial coherence, the previous distance can be extended to patches as follows, $$d_{\chi^2}(P_x, P_y) = \sum_{|z| \leq w} d_{\chi^2}(S_{x+z}, S_{y+z})$$

The weights between pixel x and y can be calculated as $w(x; y)=1$ if $d_{\chi^2}(P_x, P_y) < th$ and $w(x; y)=0$ otherwise;

where th is a threshold proportional to the number of non-empty bins in the histograms of x and y.

The invention can generate an output image wherein each pixel color is a weighted combination of the pixel colors generated from the noisy estimation (a) with weights based on the similarity measure of (b) between the respective set of samples cast from the pixels and its neighbors, wherein the final pixel is calculated as $$\overline{u}(x) = \frac{1}{\sum_y w(x, y)} \sum_y u(y) w(x, y)$$

where the color value u(y) at pixel y is calculated as a weighted average of the rays in the pixel y and its neighbors by using a box, Gaussian, Mitchell or any other classical linear filter, where u denotes the color image and $\overline{u}$ the filtered output color image.

The invention provides in particular following advantageous features:
- the invention provides a method for accelerating the convergence of a stochastic Monte Carlo render; by reusing rays for several pixels, the generated image mimics an image obtained with many more Monte Carlo samples than those actually used;
- the invention can use a matching algorithm for group of rays that is based on a similarity measure between groups of rays;
- there may be a filtering scheme where each pixel value in the final image is computed as a weighted average of the generated Monte Carlo samples and weights are based on the similarity measure.

The method can be summarized as follows:

In a first step, a noisy computer generated image is generated where the position in the image plane, the color information, and other information are available for each Monte Carlo sample (or ray).

In a second step, the group of rays arriving at a given pixel and its is neighbors are compared to the sets of rays arriving to another pixel and its neighbors. The comparison is done with a similarity measure which can be invariant to the order of the elements in the sets.

In a third step, each pixel color in the output image is computed as a weighted combination of all the pixels of the first step, weighted by the similarity measure of the second step.

Advantageously, the sets of rays should have at least two samples.

The information of each ray preferably should include at least three values consisting of: one (or generally three) value for the color of the Monte Carlo sample, and two values for its position in the image plane.

The method can be used iteratively by i) generating a first noisy image ii) identifying those pixels which are more error prone, as for example those with high sample variance iii) obtaining more samples for these pixels and iv) using any of the above methods to increase further the number of rays involved in the estimation of the colors of each pixels.

Figure 4:
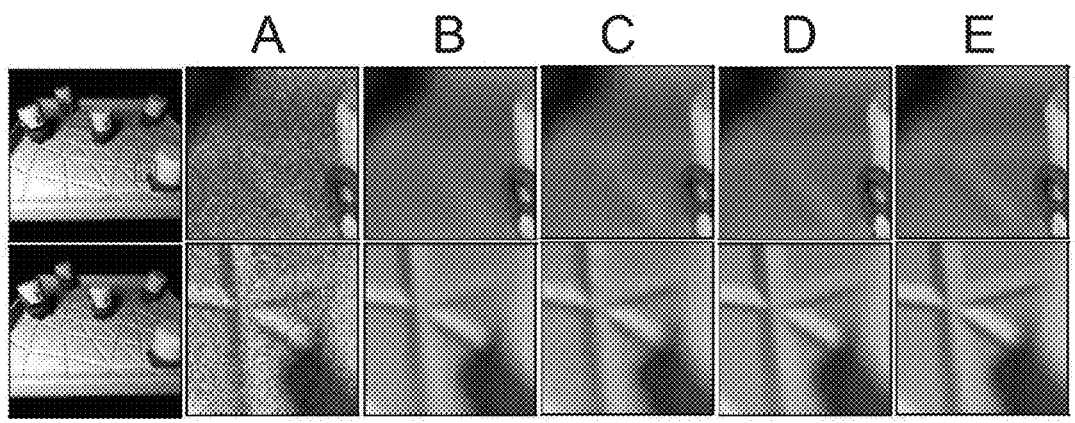

FIG. 4 shows the efficiency of the method of the invention.

Image A shows the classical Monte Carlo render, which requires about 64 seconds to be generated. Image C is the prior art ASR render, which takes about 88 seconds to be generated. Despite an overall sensible noise reduction, that method leaves visible "splotchy" noise artifacts of lower frequency. Image B shows a simplified method according to the invention, called NLMM, which is a Non-Local Means algorithm using the mean comparison, and which takes about 9 seconds to be generated. The result is much smoother than Image C, illustrating a much better denoising. However, the result is slightly blurrier. Image D shows a more complex multi-scale embodiment of the invention, called NLMH-MS, which takes about 24 seconds to be generated. The result is sharper, while preserving the smooth result of Image B. Image E shows the result of a Monte-Carlo render after several hours, used as a reference image.

It appears clearly that the invention provides similar quality to Image E in a much shorter time, and much better quality images than the prior art methods, when the times scale is comparable.

Various modifications can be envisaged by a person skilled in the art, without going beyond the scope of the present invention, as defined by the following claims.

What is claimed is:

1. An image rendering method comprising the steps of:
    (a) performing, using a processor, a noisy estimation of a given view of a given scene of an image using a Monte-Carlo stochastic renderer, wherein general information of each ray sample is stored,
    (b) calculating a similarity measure between two sets of samples cast from two pixels of said scene and their neighbors, and
    (c) generating an output image wherein each pixel color is a weighted combination of the pixel colors generated from the step (a) with weights based on the similarity measure of the step (b) between the respective set of samples cast from the pixels and their neighbors;
    wherein a color histogram is associated with each pixel containing the colors of all rays that hit the pixel;

wherein the sample data sets $S_x$ and $S_y$ cast from pixels x and y, with respective $h_x^k$ and $h_y^k$ binned histograms with $n_b$ bins, are compared using the Chi-Square distance, namely $$d_{\chi^2}(S_x, S_y) = \sum_{k=1}^{n_b} \frac{\left(\sqrt{\frac{n_y}{n_x}}\, h_x^k - \sqrt{\frac{n_x}{n_y}}\, h_y^k\right)^2}{h_x^k + h_y^k}$$

where $n_y = \Sigma h_y^k$ and $n_x = \Sigma h_x^k$ are the total number of samples in each set; and wherein, in order to take into account spatial coherence, the previous distance can be extended to patches as follows, $$d_{\chi^2}(P_x, P_y) = \sum_{|z| \leq w} d_{\chi^2}(S_{x+z}, S_{y+z}).$$

2. An image rendering method according to claim 1, wherein a histogram distance, such as the Kolmogorov-Smirnof distance, permits to evaluate the similarity of different pixels.

3. An image rendering method according to claim 2, wherein a weighted average of means of the rays in the different similar pixels is used to generate the color in the pixel.

4. An image rendering method according to claim 1, comprising a comparison of the two pixels that involves their histogram and the histograms of their neighbors so as to reinforce the similarity criterion.

5. An image rendering method according to claim 1, wherein the means, variance and other statistical moments of each ray histogram are used to compare the ray histograms.

6. An image rendering method according to claim 1, wherein the ray color histograms can be compared by comparing their component histograms, which are three one-dimensional histograms.

7. An image rendering method according to claim 1, wherein the ray color histograms are divided into 3D bins and compared directly as three-dimensional histograms.

8. An image rendering method according to claim 1, wherein other ray classification criteria obtained from additional information of the rays may be used, the ray histogram may have a higher dimension and the comparison of histograms be made in a higher dimensional space.

9. An image rendering method according to claim 1, wherein the weights between pixel x and y are calculated as $w(x; y)=1$ if $d_{\chi^2}(P_x, P_y)<th$ and $w(x; y)=0$ otherwise;

where th is a threshold proportional to the number of non-empty bins in the histograms of x and y.

10. An image rendering method comprising the steps of:
    (a) performing, using a processor, a noisy estimation of a given view of a given scene of an image using a Monte-Carlo stochastic renderer, wherein general information of each ray sample is stored,
    (b) calculating a similarity measure between two sets of samples cast from two pixels of said scene and their neighbors, and
    (c) generating an output image wherein each pixel color is a weighted combination of the pixel colors generated from the step (a) with weights based on the similarity measure of the step (b) between the respective set of samples cast from the pixels and their neighbors the method further comprising generating an output image where each pixel color is a weighted combination of the pixel colors generated from the noisy estimation of the step (a) with weights based on the similarity measure of the step (b) between the respective set of samples cast from the pixels and its neighbors, wherein the final pixel is calculated as $$\overline{u}(x) = \frac{1}{\sum_y w(x,y)} \sum_y u(y) w(x,y)$$

where the color value $u(y)$ at pixel y is calculated as a weighted average of the rays in the pixel y and its neighbors by using a box, Gaussian, Mitchell or any other classical linear filter, where u denotes the color image and the filtered output color image.

11. An image rendering method according to claim 1, wherein said method can be used iteratively by i) generating a first noisy image ii) identifying those pixels which are more error prone, as for example those with high sample variance iii) obtaining more samples for these pixels and iv) using any of the above methods to increase further the number of rays involved in the estimation of the colors of each pixels.

12. The image rendering method according to claim 1, wherein the general information of each ray sample that is stored includes at least color and position in a plane of the image plane.

13. The image rendering method according to claim 10, wherein the general information of each ray sample that is stored includes at least color and position in a plane of the image plane.

14. The image rendering method according to claim 8, wherein the additional information of the rays includes one or more of normal to a surface, object id, and object color at the last impact.

* * * * *